(12) United States Patent
Garner et al.

(10) Patent No.: US 10,820,489 B2
(45) Date of Patent: *Nov. 3, 2020

(54) ROW UNIT FOR A SEEDING MACHINE WITH PNEUMATIC SEED LOADING

(71) Applicant: Deere & Company, Moline, IL (US)

(72) Inventors: Elijah B. Garner, Bettendorf, IA (US); Stanley R. Borkgren, Geneseo, IL (US); Cary S. Hubner, Geneseo, IL (US); Beth A. Wolfs, Tiffin, IA (US); Michael E. Frasier, Iowa City, IA (US); Joseph W. Migliorini, Moline, IL (US)

(73) Assignee: DEERE & COMPANY, Moline, IL (US)

( * ) Notice: Subject to any disclaimer, the term of this patent is extended or adjusted under 35 U.S.C. 154(b) by 240 days.

This patent is subject to a terminal disclaimer.

(21) Appl. No.: 15/888,912

(22) Filed: Feb. 5, 2018

(65) Prior Publication Data

US 2019/0239426 A1 Aug. 8, 2019

(51) Int. Cl.
*A01C 7/20* (2006.01)
*A01C 7/04* (2006.01)

(52) U.S. Cl.
CPC ............... *A01C 7/20* (2013.01); *A01C 7/046* (2013.01); *A01C 7/206* (2013.01)

(58) Field of Classification Search
CPC ............ A01C 7/20; A01C 7/046; A01C 7/206
See application file for complete search history.

(56) References Cited

U.S. PATENT DOCUMENTS

| 1,331,235 A | * | 2/1920 | Bristow | ................. | A01C 7/046 |
| | | | | | 221/211 |
| 3,762,603 A | | 10/1973 | Bauman et al. | | |

(Continued)

FOREIGN PATENT DOCUMENTS

| DE | 2261344 C3 | 5/1979 |
| DE | 8108744 U1 | 7/1981 |

(Continued)

OTHER PUBLICATIONS

Amazone, "EDX Precision Airplanter," website (retrieved from the Internet on Apr. 30, 2018) pp. 1-9, http://amazone.net/1265.asp.

(Continued)

*Primary Examiner* — Jamie L McGowan
(74) *Attorney, Agent, or Firm* — Michael Best & Friedrich LLP

(57) ABSTRACT

A row unit for a seeding machine includes a seed reservoir and a seed meter having a metering member configured to rotate about an axis. The metering member has a seed side facing the seed reservoir, a non-seed side opposite the seed side, and a plurality of apertures. The axis is normal to a surface of the seed side. The seed meter is operable by pressure differential between the non-seed side and the seed side to adhere seeds to the seed side and move seeds from the seed reservoir. The row unit also includes a positive pressure air source and an air outlet fluidly coupled to the positive pressure air source. The air outlet is disposed on the seed side and aimed to discharge an air stream towards one aperture of the plurality of apertures. The dischargeable air stream has a directional component parallel to the axis.

19 Claims, 12 Drawing Sheets

(56) References Cited

U.S. PATENT DOCUMENTS

| | | | | |
|---|---|---|---|---|
| 3,885,704 | A | 5/1975 | Lienemann et al. | |
| 4,037,755 | A * | 7/1977 | Reuter | A01C 7/044 221/211 |
| 4,399,757 | A * | 8/1983 | Maury | A01C 7/206 111/34 |
| 5,170,909 | A * | 12/1992 | Lundie | A01C 7/046 221/211 |
| 5,740,747 | A * | 4/1998 | Stufflebeam | A01C 7/046 111/185 |
| 6,283,051 | B1 | 9/2001 | Yoss | |
| 6,332,413 | B1 | 12/2001 | Stufflebeanm et al. | |
| 6,681,706 | B2 * | 1/2004 | Sauder | A01C 7/04 111/171 |
| 7,490,565 | B2 | 2/2009 | Holly | |
| 8,336,471 | B2 | 12/2012 | Gilstring | |
| 8,375,873 | B2 | 2/2013 | Nelson et al. | |
| 8,561,558 | B2 | 10/2013 | Beier | |
| 8,869,719 | B2 * | 10/2014 | Garner | A01C 7/046 111/182 |
| 9,137,941 | B2 | 9/2015 | Stark | |
| 2007/0039529 | A1 * | 2/2007 | Sauder | A01C 7/046 111/185 |
| 2010/0224110 | A1 * | 9/2010 | Mariman | A01C 7/046 111/11 |
| 2010/0282146 | A1 * | 11/2010 | Rans | A01C 7/046 111/185 |
| 2011/0098851 | A1 * | 4/2011 | Glendenning | A01C 7/046 700/240 |
| 2012/0067260 | A1 * | 3/2012 | Garner | A01C 7/042 111/171 |
| 2014/0144357 | A1 * | 5/2014 | Garner | A01C 7/20 111/170 |
| 2015/0059627 | A1 * | 3/2015 | Kinzenbaw | A01C 7/044 111/200 |
| 2017/0105334 | A1 | 4/2017 | Nyc et al. | |
| 2017/0303463 | A1 * | 10/2017 | do Amaral Assy | A01C 7/046 |
| 2017/0367253 | A1 * | 12/2017 | Engel | A01C 7/046 |

FOREIGN PATENT DOCUMENTS

| | | |
|---|---|---|
| DE | 3633956 A1 | 5/1987 |
| DE | 8713992 U1 | 11/1987 |
| DE | 3826397 | 1/1989 |
| DE | 4419964 C2 | 12/1996 |
| DE | 10037351 A1 | 2/2002 |
| DE | 102015101255 A1 | 7/2016 |
| DE | 102015101256 A1 | 7/2016 |
| EP | 0037775 A1 | 10/1981 |
| EP | 2168417 A2 | 3/2010 |
| EP | 2747541 B1 | 4/2016 |
| FR | 2323308 | 4/1977 |
| WO | 2010051991 A1 | 5/2010 |
| WO | 2011056138 A1 | 5/2011 |
| WO | 2017/182997 | 10/2017 |

OTHER PUBLICATIONS

German Search Report issued in counterpart application No. 102019201388.0 dated Aug. 28, 2019. (12 pages).

* cited by examiner

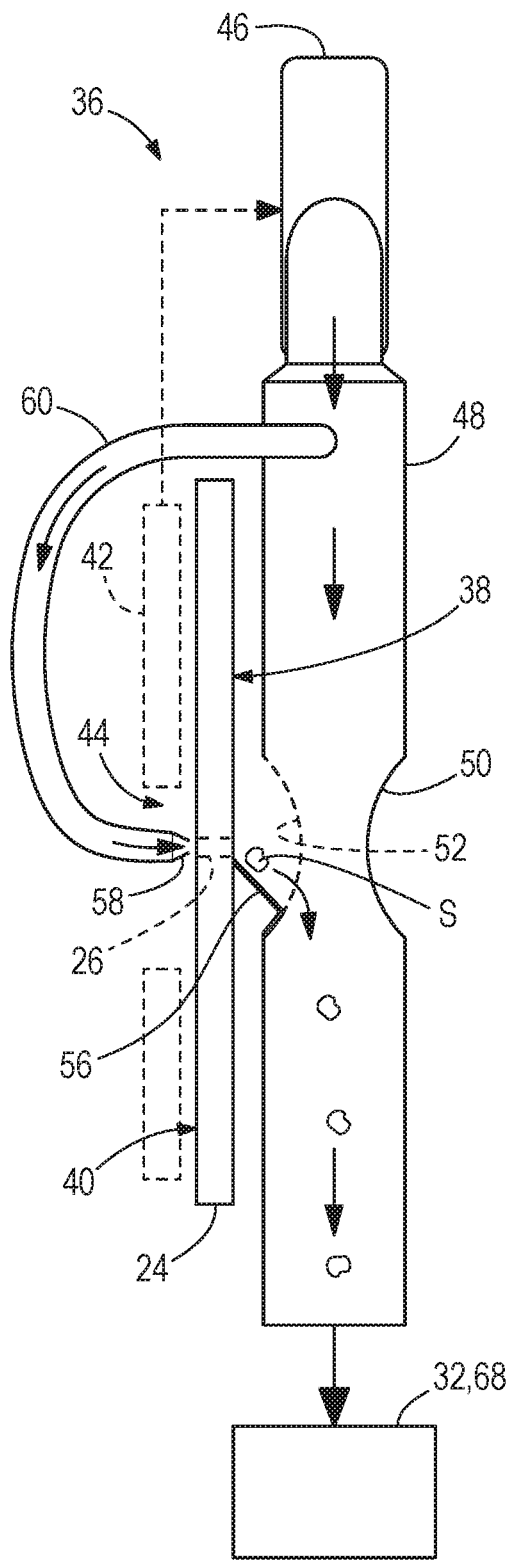
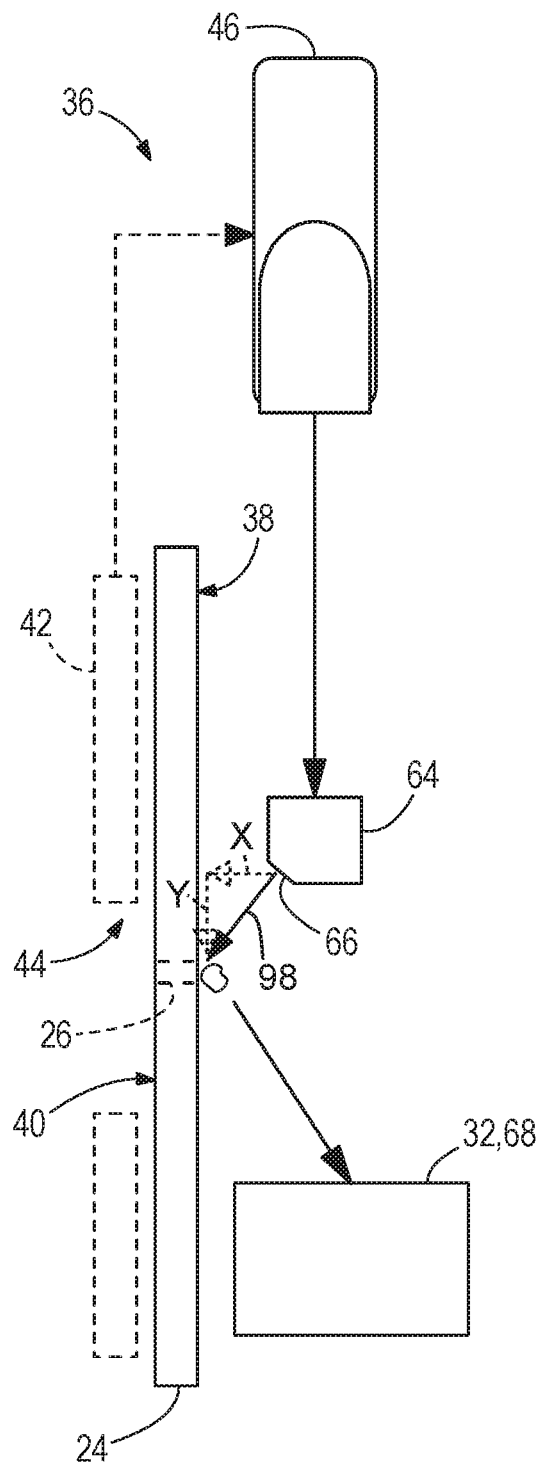
FIG. 5
FIG. 6

ROW UNIT FOR A SEEDING MACHINE WITH PNEUMATIC SEED LOADING

BACKGROUND

The present disclosure relates to a row unit for a seeding machine, such as a row crop planter for agricultural applications. More specifically, the present disclosure relates to a row unit having a seed meter and a seed delivery mechanism.

SUMMARY

A row unit for a seeding machine includes a seed reservoir and a seed meter having a metering member configured to rotate about an axis. The metering member has a seed side facing the seed reservoir, a non-seed side opposite the seed side, and a plurality of apertures extending from the seed side to the non-seed side. The axis is normal to a surface of the seed side. The seed meter is operable by pressure differential between the non-seed side and the seed side to adhere seeds to the seed side and move seeds from the seed reservoir. The row unit also includes a positive pressure air source and an air outlet fluidly coupled to the positive pressure air source. The air outlet is disposed on the seed side and aimed to discharge an air stream towards one aperture of the plurality of apertures. The dischargeable air stream has a directional component parallel to the axis.

A method for displacing seeds from a metering member in a seeding machine, in which the seeding machine has a seed reservoir, a seed meter assembly including the metering member having a seed side facing the seed reservoir, a non-seed side opposite the seed side, and a plurality of apertures extending from the seed side to the non-seed side, and in which the metering member is operable to selectively transport seeds from the seed reservoir, includes rotating the metering member about an axis normal to a surface of the seed side. The method also includes generating a pressure differential across at least some apertures of the plurality of apertures for adhering seeds to the metering member. The method further includes directing an air stream at the seed side and towards one aperture of the plurality of apertures. The air stream has a directional component parallel to the axis.

Other aspects of the disclosure will become apparent by consideration of the detailed description and accompanying drawings.

BRIEF DESCRIPTION OF THE DRAWINGS

FIG. 5 is a front view schematic diagram of the seed displacer of FIG. 4A.

FIG. 6 is a front view schematic diagram of an alternative implementation of the seed displacer of FIGS. 4-5.

FIGS. 9A-10 are side views of a portion of the seed meter assembly and seed delivery mechanism having another alternative seed injection mechanism.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
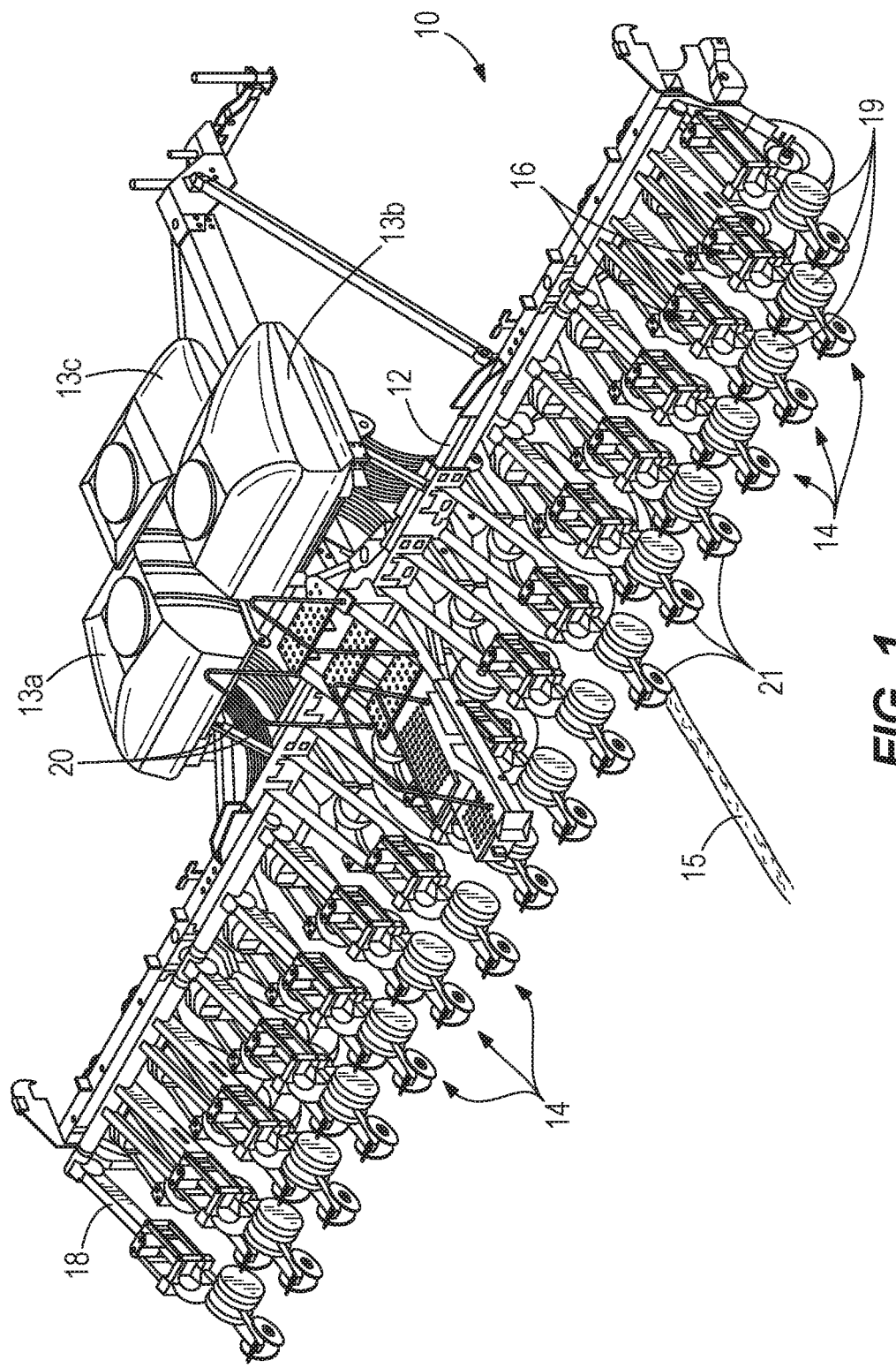
FIG. 1 is a perspective view of a seeding machine.
Figure 2:
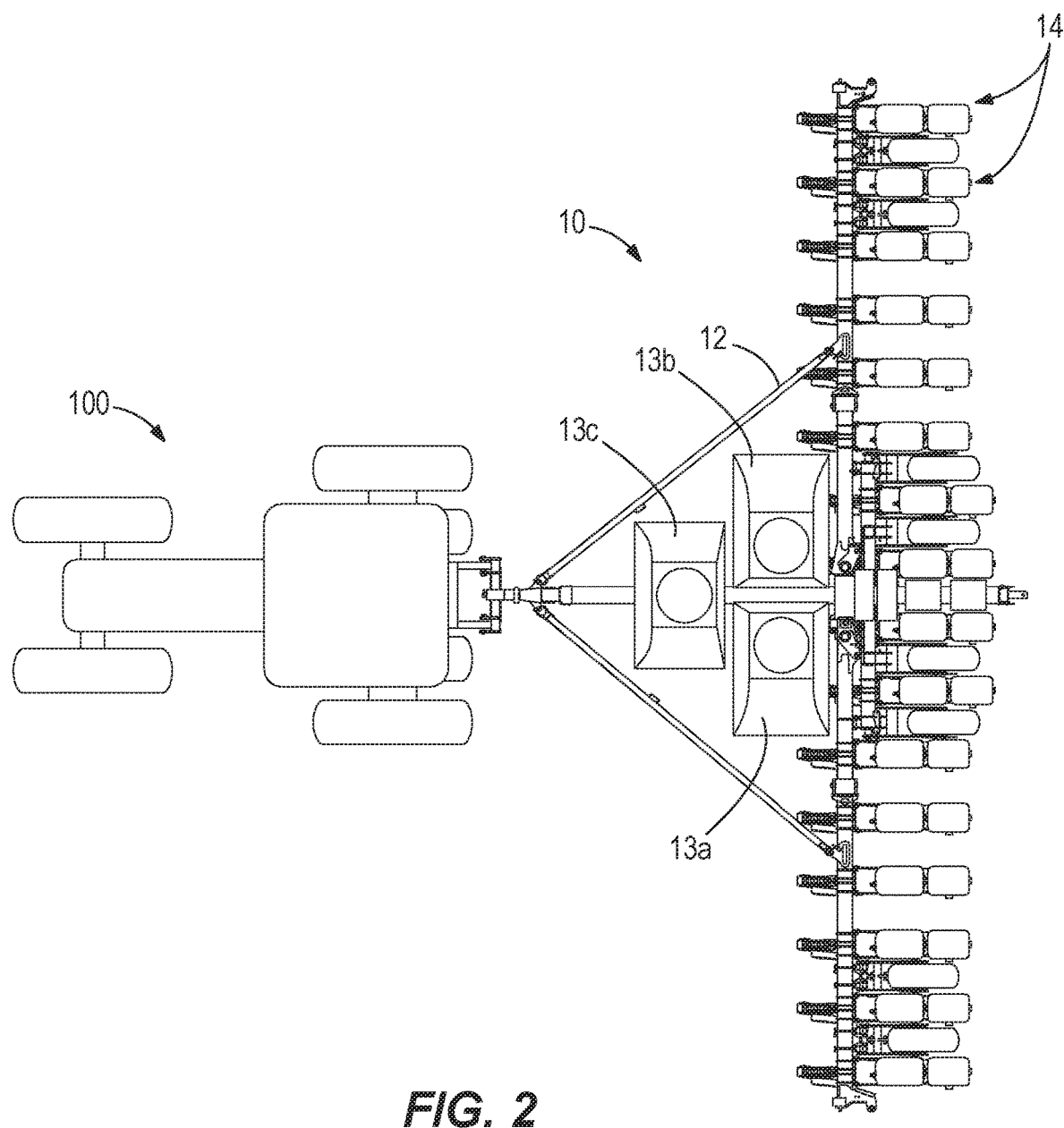
FIG. 2 is a top view of the seeding machine of FIG. 1 coupled to a towing vehicle.

FIGS. 1-2 illustrate a seeding machine 10, such as a row crop planter pulled by a vehicle 100, such as a tractor (FIG. 2). The seeding machine 10 has a frame 12 on which are mounted a plurality of individual row units 14. Seed sources, such as storage tanks 13a-13c, hold seed that may be delivered, e.g., pneumatically, to a mini-hopper (not shown) on each row unit 14. The storage tanks 13a-13c may be coupled to the mini-hoppers by way of conduits 20, such as hoses, and a pressurized delivery apparatus (not shown). Each storage tank 13a-13c can be used to contain the same variety of seeds, or a different variety of seeds. For example, a first storage tank 13a may contain a first variety of seeds, a second storage tank 13b may contain a second variety of seeds, and a third storage tank 13c may contain a third variety of seeds. The varieties are typically within the same crop (such as corn, soy, etc.), with each variety having different traits which allows a more optimal variety to be planted at a given location in a field. The traits may include tolerances of seed to disease, drought, moisture, pests, and other seed characteristics, etc. Thus, each row unit 14 can be coupled to several conduits 20 such that each row unit 14 is coupled to each storage tank 13a-13c to receive the first, second, and third varieties of seed. In other implementations, the storage tanks 13a-13c may contain the same variety of seed.

Each row unit 14 has a frame 18 to which the components of the row unit 14 are mounted. For example, the frame 18 may carry furrow opening disks 19 for forming a furrow 15 with an open furrow in the soil beneath the seeding machine 10 into which seed is deposited, and closing wheels 21 to close the furrow over the deposited seed in the furrow 15. The frame 18 may also carry a press wheel 84 (FIG. 3) for pressing the seed into the bottom of the furrow 15 or a packing wheel (not shown) to firm the soil over the deposited seed after the furrow is closed.

Figures 3, 3A:
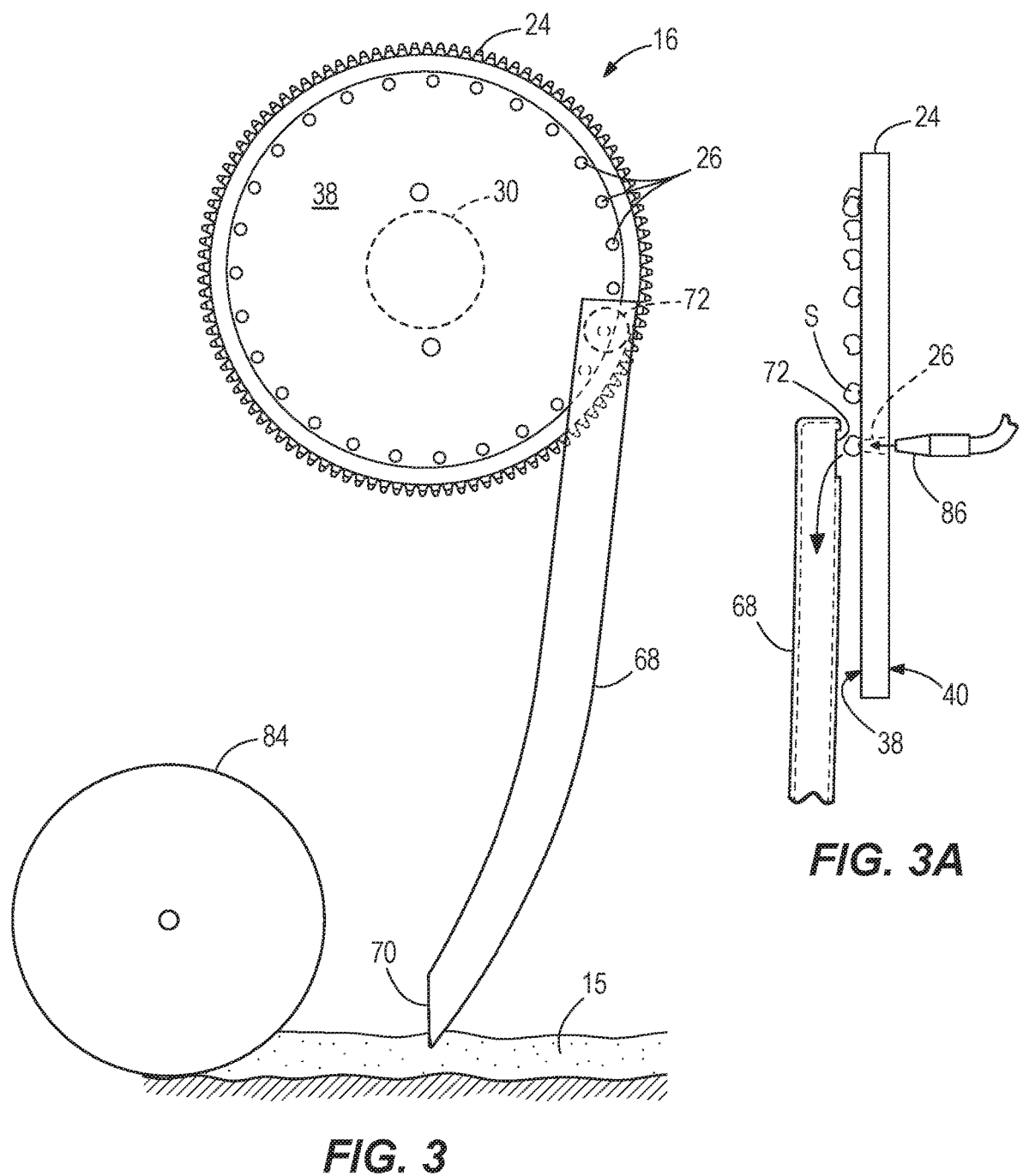
FIG. 3 is a side view of a portion of a seed meter assembly and a seed tube for the seeding machine of FIG. 1.
FIG. 3A is a front view of a portion of the seed meter assembly shown in FIG. 3.

As illustrated in FIG. 3, a seed meter assembly 16 having one or more seed metering members 24 is coupled to each row unit frame 18. The seed metering assembly 16 is coupled to one or more of the storage tanks 13*a*-13*c* by way of the conduits 20. The seed meter assembly 16 may have one, two, three or more metering members 24 coupled to each row unit frame 18. FIGS. 3, 3B, 4, 5, 6, and 9-10 illustrate a single metering member 24, but two or more metering members 24 may be used in any of these implementations, such as the examples showing two metering members 24, 24' in FIGS. 7, 8, and 11-12. Each metering member 24 takes seeds from a seed reservoir 28 supporting a seed pool (FIG. 4) and sequentially discharges single seeds (metered seeds) for delivery one at a time (e.g., singulates and meters the seeds). One or more of the metering members 24 use a negative air pressure differential (e.g., a vacuum), as will be described in greater detail below, to adhere seeds to the metering member 24, which can be in the form of a disk, a bowl, or more generally a plate, having apertures 26 that extend therethrough. The apertures 26 are generally arranged circumferentially about a meter axis A, substantially in a circle, proximate an outer edge of the metering member 24. The metering member 24 may be driven to rotate by a motor 30, such as an electric motor, or by any other suitable drive mechanism, such as a transverse hex shaft driven by a ground wheel or electric or hydraulic motor and coupled to individual meters by chains or drive cables, etc.

With reference to FIGS. 4-7, the seed reservoir 28 containing a seed pool is positioned on a seed side 38 of each metering member 24 at a lower portion thereof, and is connected to one or more of the storage tanks 13*a*-13*c* to receive seeds therefrom by way of the conduits 20. Thus, the seed side 38 faces the seed reservoir 28. A pressure differential is applied across the metering member 24 from the seed side 38 of the metering member 24 to a non-seed side 40 of the metering member 24, through the apertures 26. In the illustrated examples, a negative pressure, or vacuum applied on the non-seed side 40 provides a suction force that adheres a seed S to the seed side of the metering member 24 at the apertures 26. The pressure differential is applied in a vacuum zone 42 illustrated in FIG. 4 across a portion of the metering member 24, and thus across some, but not all of the apertures 26. The vacuum zone 42 is formed by a vacuum chamber defined by the meter housing or cover and a seal that engages the non-seed side of the metering member 24. In the illustrated implementations, the pressure differential draws seeds into adherence with the seed side 38 of the metering member 24. In order to release a seed, one seed at a time (e.g., to meter, or singulate, the seeds), the vacuum is terminated at a desired release position in an area referred to herein as a vacuum cutoff 44. The vacuum cutoff 44 is a region disposed immediately adjacent the vacuum chamber in a circumferential direction with respect to the meter axis X, the vacuum cutoff 44 not under the influence of the pressure differential. Mechanical and/or pneumatic assistance (as will be described in greater detail below) is utilized to knock, pull, or push the seed off the metering member 24, interfere with the aperture 26 to disrupt the pressure differential, or otherwise release the seed. The mechanical and/or pneumatic assistance described below may be disposed at the vacuum cutoff 44 or employed without a vacuum cutoff while the seed is adhered to the metering member 24 by the pressure differential. In yet other implementations, other types of metering members 24 for metering/singulating the seeds may be employed. In further implementations, rather than applying a vacuum to the non-seed side of the metering member 24, a positive pressure may be applied to the seed side to adhere the seeds S to the metering member 24. It should be understood that positive and negative are relative terms. As such, the terms "positive pressure" and "negative pressure" are meant to describe relative pressures in a pressure differential. For example, a positive pressure is one that is higher than its surroundings (e.g., higher than atmospheric pressure or than another pressure in the seeding machine 10), and a negative pressure is one that is lower than its surroundings (e.g., lower than atmospheric pressure or than another pressure in the seeding machine 10).

A seed displacer 36 is disposed adjacent the metering disk(s) 24 for removing seed from the metering member and moving the seed to or toward the furrow 15 as described below. Generally, the seed displacer 36 encourages dislodging metered seeds from one (or both) of the metering members 24 and moving the metered seeds to or toward the furrow 15. The seed displacer implementations described herein are pneumatic seed displacers using air to move metered seeds away from the metering member 24 either by pushing or pulling and may be employed in combination with mechanical assistance, as will be described in greater detail below.

Figure 4:
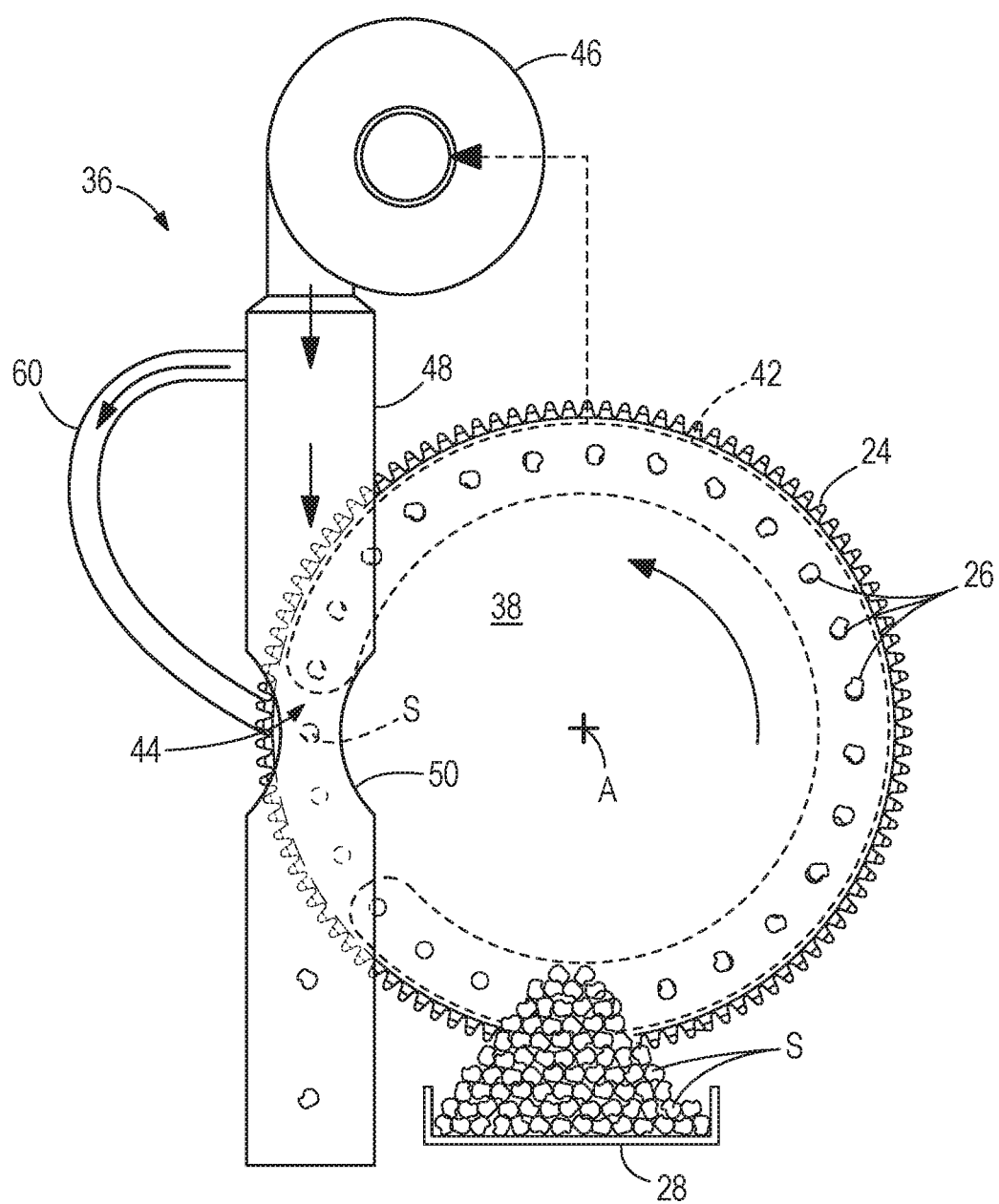
FIG. 4 is a side view schematic diagram of a seed displacer for the seeding machine of FIG. 1.

With reference to FIGS. 4-5, an air pressure source, such as a blower 46 or pump provides positive pressure air to a main conduit 48 having a venturi 50 (e.g., a constriction, an orifice, etc.), disposed adjacent the vacuum cutoff 44 of the metering member 24. More specifically, the venturi 50 is disposed adjacent the metering member 24 in an axial direction (parallel to axis A) on the seed side 38 of the metering member adjacent the vacuum cutoff 44. An inlet 52 (such as an opening) into the conduit 48 may be provided at the constriction to provide a suction force on the seed side 38 of the metering member 24. Thus, the venturi 50 provides a pressure drop, referred to herein as a venturi zone 54, on the seed side 38 for drawing the seed away from the metering member 24 and into the conduit 48 and is disposed to do so at a location immediately adjacent an end of the vacuum zone 42 (in the vacuum cutoff 44). Thus, the venturi 50 is disposed to draw a seed as, or closely after, the vacuum adhering the seed to the metering member 24 is cut off. In other implementations, the venturi 50 may be disposed in or adjacent the vacuum zone 42 to draw a seed from the metering member 24 even as the vacuum for adhering the seed is still being applied.

A blade 56 (FIG. 5) may be disposed on the seed side 38 of the metering member 24 for mechanically encouraging, or leading, the metered seed into the conduit 48 and towards the seed delivery mechanism 32. The blade 56 may include a fin, flap, projection, or any cantilevered member extending from the conduit 48, formed therewith or separately from the conduit. The blade 56 is stationary with respect to the row unit frame 14 while the metering member 24 rotates with respect to the row unit frame 14, and with respect to the blade 56. The blade 56 may be coupled to the conduit 48 or separate therefrom. The distal end of the blade 56 may be disposed in contact with the metering member 24 or disposed closely to the metering member 24 so as to contact at least the metered seed S while spaced from the metering member 24. The distal end of the blade 56 may be blunt, sharp, rounded, pointed, knife-edge, or any other suitable finish. The blade 56 may be flexible and bear against the metering member 24. The blade 56 is disposed in the venturi zone 54 for mechanically leading the metered seed into the conduit 48, thereby cooperating with the venturi 50 to draw the metered seed into the conduit 48. The venturi 50 may be employed with or without the blade 56. Likewise, the blade 56 may be employed without the venturi 50.

In addition to the lower pressure of the venturi 50 drawing seed into the conduit 48, the seed displacer 36 may also use positive pressure to assist in removing seed from the metering member (FIG. 5). A positive pressure conduit 60, such as a tube or a hose, may be coupled to the blower 46 outlet and/or may siphon positive pressure off the main conduit 48 in a shared pressure source relationship. In other implementations, the positive pressure conduit 60 may be coupled to a separate pressure source. The conduit 60 terminates in a nozzle 58 positioned adjacent the non-seed side of the metering member 24 along the path of the apertures 26 at or immediately following the vacuum cutoff 44. The nozzle 58 may be fixed with respect to the frame 12. The positive air pressure from the nozzle 58 passes through the apertures 26 towards the seed side 38 of the metering member 24 and may nudge, push, or blast the metered seed off the metering member 24 and into the main conduit 48. The positive pressure may be applied continuously or as pulsating puffs. Pulsating puffs of air may be timed to the passing of each aperture 26 into the vacuum cutoff 44 and may be provided by controlling a valve (not shown) in the positive pressure conduit 60. The nozzle 58 may be employed with or without the venturi 50 and with or without the blade 56. The venturi 50 may be employed independently, or with the blade 56 alone, or with the positive pressure nozzle 58 alone or with both the blade 56 and nozzle 58.

Figures 8, 8A:
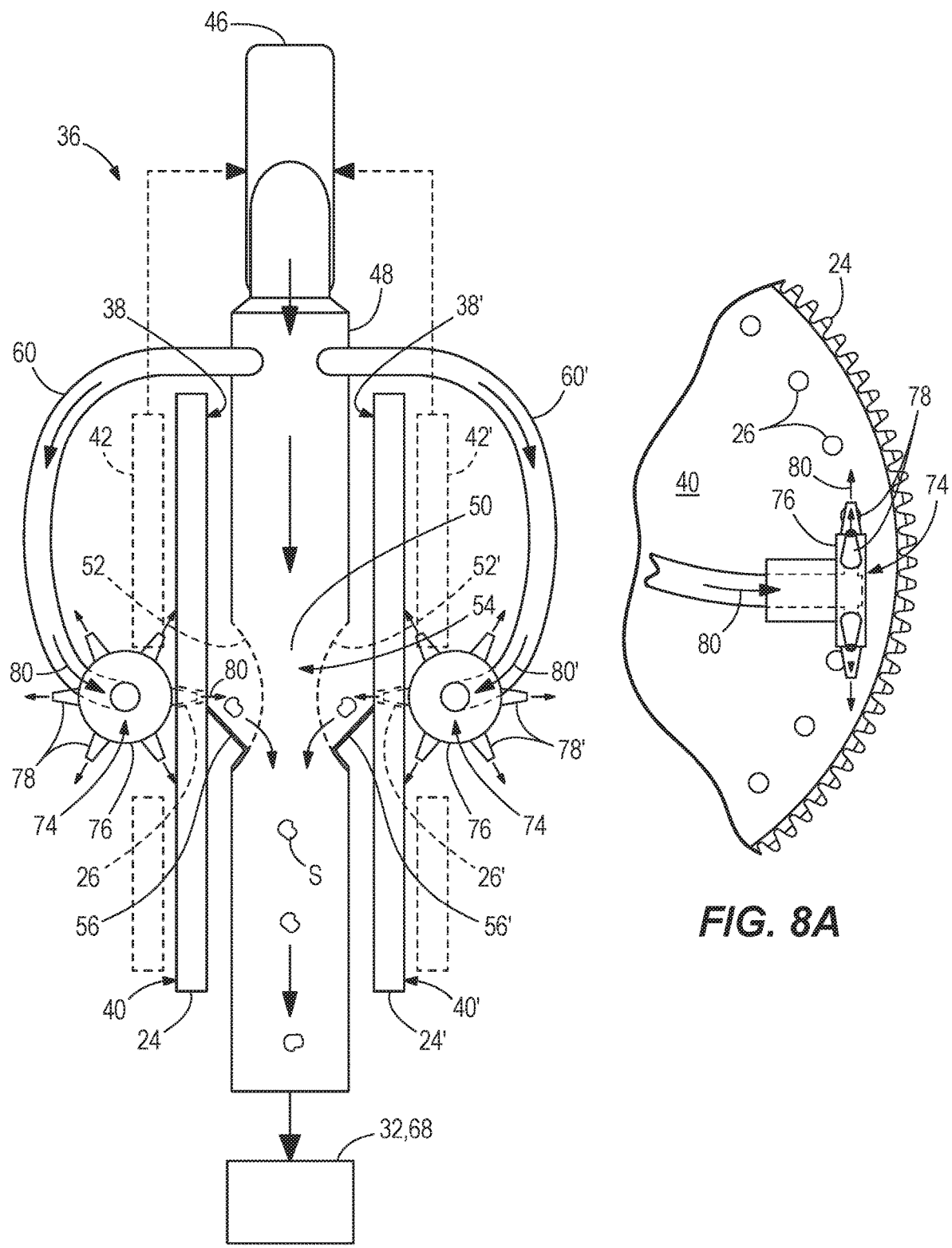
FIG. 8 is a front view schematic diagram of another alternative implementation of the seed displacer of FIGS. 4-5.
FIG. 8A is a side view schematic diagram of a portion of the seed displacer of FIG. 8.

As an alternative to the fixed nozzle 58, the seed displacer 36 may include a rotatable knock-out wheel 74, as illustrated in FIG. 8. The knock-out wheel 74 includes a hub 76 mounted rotatably about an axis B and a plurality of projections 78 extending generally radially with respect to the axis B. The knock-out wheel 74 is disposed on the non-seed side 40 of the metering member 24 such that one of the projections 78 at a time extends at least partially into, or completely through, one of the apertures 26 of the metering member 24 as the knock-out wheel 74 rotates. Thus, the hub is driven to rotate by meshing of the projections 78 with the metering member 24. A flow path 80 may be defined by a channel through the knock-out wheel 74 between an inlet and an outlet(s). The inlet may be disposed in the hub such that the flow path 80 extends first generally axially into the knock-out wheel 74, and the outlets may be disposed at distal ends of each of the projections 78 such that the flow path 80 then extends generally radially out of the knock-out wheel 74. Thus, the projections 78 are formed as air nozzles. An air source, such as the blower 46 or another independent air source, such as a different blower, compressed air, etc., provides positive pressure air to the knock-out wheel 74. The knock-out wheel 74 may be coupled to the conduit 60 to receive positive pressure air from the air source. The knock-out wheel 74 may be configured to eject air continuously or only at or near when a projection 78 is inserted in an aperture 26 of the metering member 24. For example, all of the projections 78 may eject air continuously, or the knock-out wheel 74 may include a seal (not shown) or other suitable structure that closes the projections 78 that are not at or near the aperture 26 and allows only the one projection 78 disposed at or near the aperture 26 to eject air. The projections 78 provide a focused stream of air aimed through the aperture 26 at the metered seed S. The projection 78 mechanically and pneumatically urges the seed S away from the metering member 24 and towards the furrow 15.

As another alternative to the fixed nozzle 58, the positive pressure conduit 60 may lead to a positive pressure chamber (not shown) on the non-seed side 40.

The seed displacer 36 may also include an air knife 64, as illustrated schematically in FIG. 6. The air knife 64 may include a nozzle 66, an outlet, or other concentrating means configured to provide a focused stream of pressurized, high speed air, aimed at the seed side 38 of the metering member 24 in the vacuum cutoff 44. More specifically, the nozzle 66 is aimed towards the vacuum cutoff 44 immediately adjacent the vacuum zone 42 in the circumferential direction, towards an area of the metering member 24 not under the influence of the pressure differential adhering seeds S to the metering member 24. Immediately adjacent may include a region within 5 angular degrees (about the meter axis A) of an end of the vacuum zone 42, within 10 angular degrees (about the meter axis A) of the end of the vacuum zone 42, within 15 angular degrees (about the meter axis A) of the end of the vacuum zone 42, within 20 angular degrees (about the meter axis A) of the end of the vacuum zone 42, etc. Specifically, the air knife 64 is aimed to discharge a stream of air 98 at, near, above or below a metered seed in the vacuum cutoff 44. The nozzle 66 may provide a thin but relatively wide stream of air, or may provide a narrow stream of air. The air knife 64 may be employed with or without the blade 56, with or without the positive pressure nozzle 58 and with or without the venturi 50. For example, the air knife 64 may be disposed adjacent the main conduit 48 and aimed at the seed side 38 of the metering member 24 in the vacuum cutoff 44, just above the blade 56. As shown in FIG. 6, the air knife 64 is configured to discharge the stream of air 98 towards the seed side 38, e.g., non-parallel to the seed side 38. The direction of the air stream 98 may be broken up into vector components, or directional components, X and Y (and Z, not shown). It should be noted that the direction of the air stream 98 may not include a component in the Z-direction. The directional component X is parallel to the meter axis A and normal to the surface of the seed side 38. The directional component Y is normal to the meter axis A and parallel to the surface of the seed side 38. The directional component Z (not shown) is normal to the meter axis A, parallel to the surface of the seed side 38, and normal to the directional component Y. Preferably, the nozzle 66 is aimed to discharge the air stream 98 in a direction including a component parallel to the meter axis A (e.g., having a component in the X-direction). In other implementations, the air knife 64 may be aimed directly at the seed S parallel to the metering member surface on the seed side 38 (e.g., having only a Y-direction component). In other implementations, however, the air knife 64 may be aimed at the non-seed side 40 to blow the seed S from behind through the aperture 26.

Figure 7:
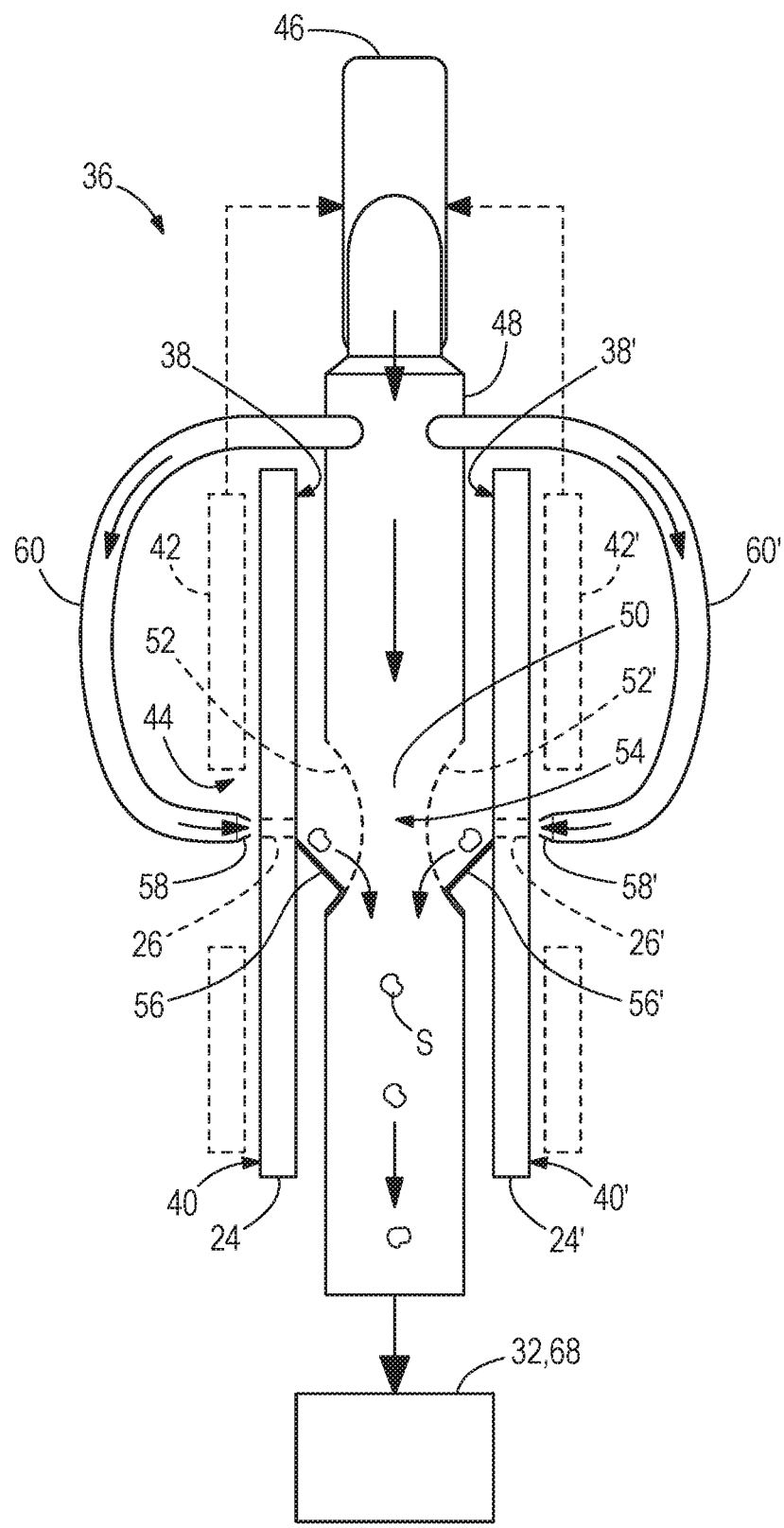
FIG. 7 is a front view schematic diagram of another alternative implementation of the seed displacer of FIGS. 4-5.

FIG. 7 illustrates an example of the seed displacer 36 employed with dual metering members 24, 24'. Parts of the seed displacer 36 and the metering member 24 may be mirrored and are denoted herein with a after the same reference numeral used above. For example, the metering members 24, 24' may be disposed such that the seed sides 38, 38' are facing each other, the seed reservoir 28 being disposed between the metering members 24, 24'. In other implementations, there may be separate seed reservoirs 28 (not shown) for each metering member 24, 24' such that each metering member 24, 24' attracts seeds from different seed pools. In this way, different types of seeds can be provided to a single furrow 15. The seed displacer 36 may include a second inlet 52' in the main conduit 48 and a second blade 56', both disposed adjacent the seed side 38' of the second metering member 24' similarly as described above with respect to the first blade 56 and the first inlet 52. The seed displacer 36 may also include a second positive pressure nozzle 58'. The seed displacer 36 may also include two air knives 64, 64', the second air knife 64' disposed similarly as described above but facing the second metering member 24'.

The seed displacer 36 may also include two blades 56, 56' disposed similarly as described above but facing the second metering member 24'. Any combination of the venturi 50, the blades 56, 56', the positive pressure nozzles 58, 58', and the air knives 64, 64' may be employed with the dual metering members 24, 24'.

In the illustrated implementations, the blower 46 provides the vacuum for the vacuum zone 42 on an intake side of the blower 46. The blower 46 also provides the positive pressure on an outlet side of the blower 46 for the positive pressure nozzles 58, 58' and/or for the main conduit 48 with the venturi 50 and/or for the air knife 64, 64'. In other implementations, the blower 46 may be separate from a blower providing the vacuum for the vacuum zone 42. The positive pressure nozzle(s) 58, 58', the main conduit 48, and the air knife/knives 64, 64' may each have their own dedicated blower or may share one or more blowers in any combination to provide the positive pressure to each, with any one or more of the blowers also providing the vacuum for the vacuum zone 42.

With reference to FIGS. 9-12, a seed delivery mechanism 32 may be coupled to each row unit frame 18. The seed delivery mechanism 32 receives metered seeds S from each metering member 24 and delivers the seeds to the furrow 15. The seed delivery mechanism 32 may include a conduit defining a pneumatic tube to direct seeds from one or more metering members 24 to the furrow 15 by way of positive air pressure (FIGS. 3-3B), as will be discussed in greater detail below. In other implementations, a conduit 22, or conveyor, may define a channel for a belt 34 (e.g., as shown in FIGS. 9-12), which receives the metered seeds from each metering member 24, conveys the metered seeds toward the ground, and expels the metered seeds in the furrow 15. The belt 34 may be driven by a motor (not shown), such as an electric motor, or by any hydraulic or pneumatic drive as well as various types of mechanical drives. The belt 34 can be in the form of a brush belt (e.g., FIG. 10) with bristles for trapping, holding, and releasing the metered seeds whereby the seed movement between the seed meter and the furrow 15 is controlled. In other implementations, the seed delivery mechanism 32 may include other types of belts, such as a foam belt, a conveyor belt, a flighted belt (e.g., FIGS. 9, 11, and 12), a pocketed belt, a belt with resilient fingers, etc. In yet other implementations, the seed delivery mechanism 32 can include other types of mechanisms suitable for receiving seeds from each metering member 24 and conveying the seeds to the furrow 15.

Figure 3B:
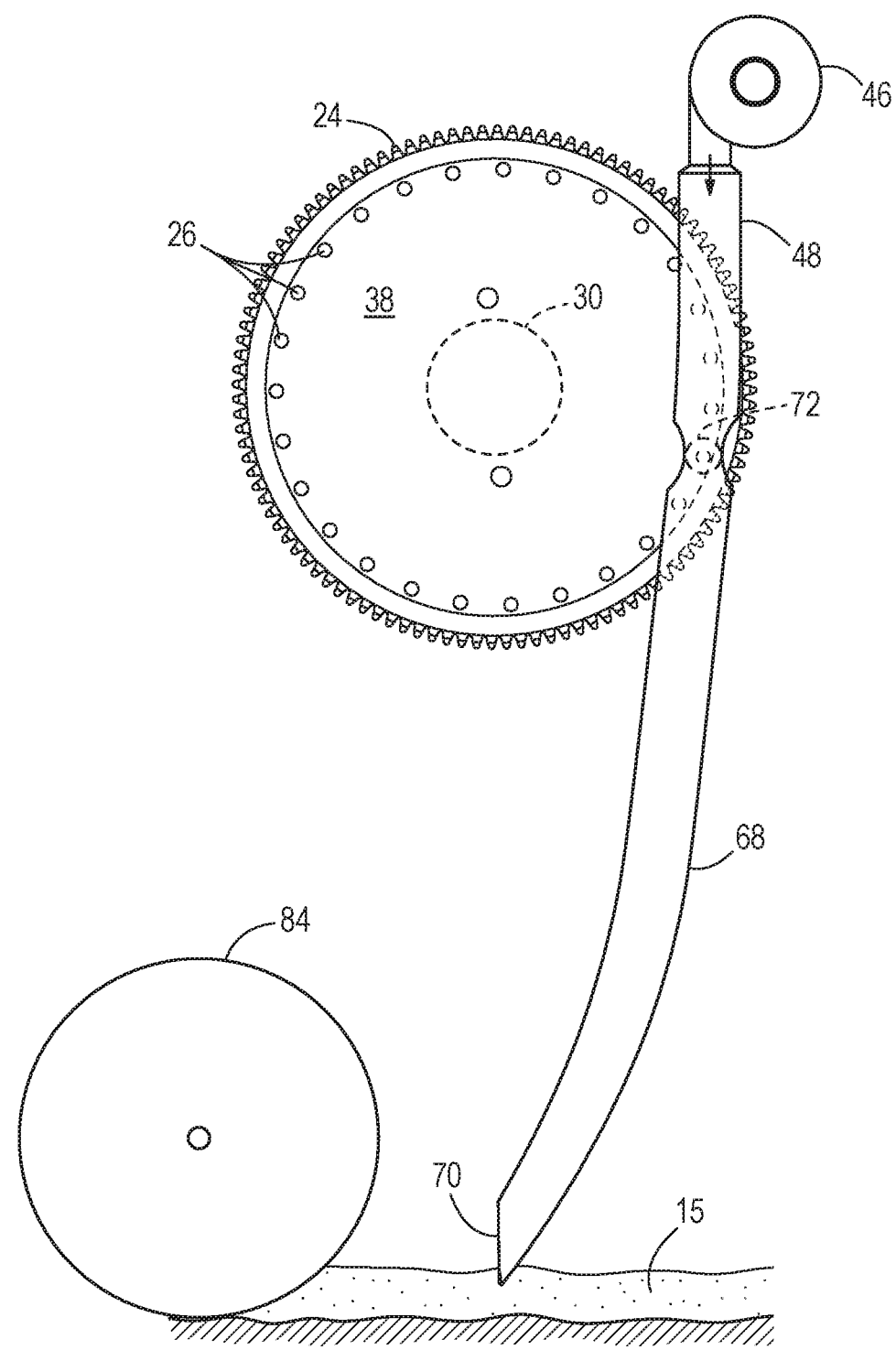
FIG. 3B is an alternate side view of a portion of a seed meter assembly and a seed tube for the seeding machine of FIG. 1.

With reference again to FIG. 3, the seed may alternatively be delivered to the furrow 15 by a pneumatic seed tube 68. The seed tube 68 may be a conduit having an inlet 72 and an exhaust outlet 70. The inlet 72 receives air to direct seeds from one or more metering members 24 to the furrow 15 by way of positive air pressure, through the exhaust outlet 70. The positive air pressure may be provided by positive pressure on the seed side 38 of the metering member 24 in a positive pressure meter. This may include a nozzle 86 on the non-seed side 40 to blow seeds from the apertures 26 into the seed tube 68 as shown in FIG. 3A. As an alternative to the nozzle 86 on the non-seed side 40, an air knife 64 and/or blade 56 (such as those described above) may be used to direct seed from the metering member 24 into the seed tube 68. With reference to FIG. 3B, the blower 46 may provide the positive pressure for the seed tube 68. For example, the main conduit 48 may merge with the seed tube 68 and extend to the furrow 15. Exhaust from the main conduit 48 provides seed delivery air to the seed tube 68. The main conduit 48 and the seed tube 68 may be formed as one piece or as separate pieces coupled together. The venturi 50 and/or other features of the seed displacer 36 described above (e.g., with respect to FIGS. 4-5) may be included in this implementation. Alternatively, no venturi or other features of the seed displacer 36 need be included in this implementation. This implementation may be used with either a positive pressure meter or a vacuum meter as the positive pressure to deliver seed to the furrow 15 is provided by the blower 46. In other implementations, a different air source may provide, or supplement, the air pressure in the seed tube 68. An air brake (not shown) may be provided in the seed tube 68 proximate the exhaust outlet 70 (FIGS. 3 and 3B) where the seed is released into the furrow 15 for reducing the speed of the air flow at the exhaust outlet 70.

Figure 4A:
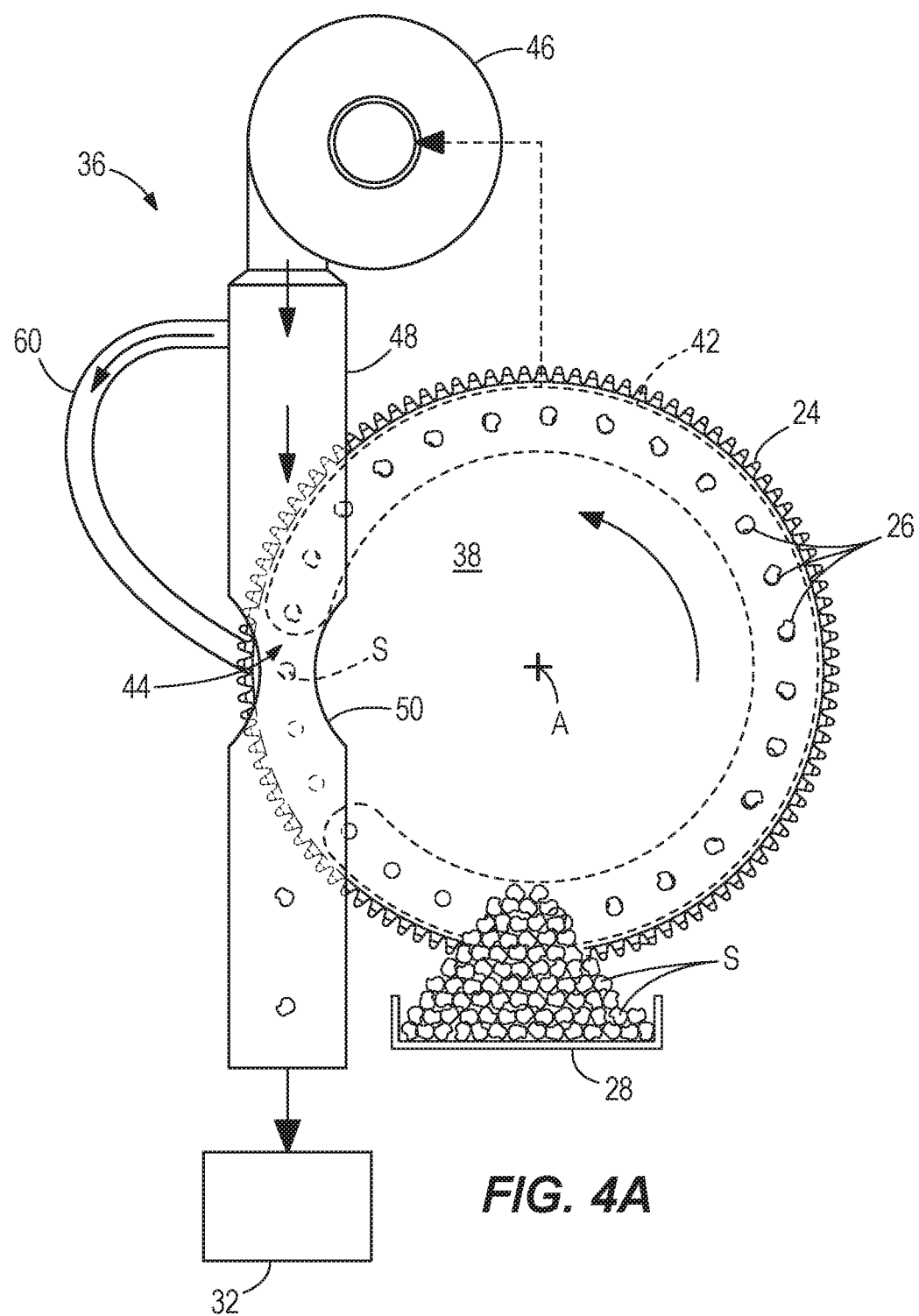
FIG. 4A is an alternative side view schematic diagram of a seed displacer for the seeding machine of FIG. 1.

As shown schematically in FIG. 4A, in other implementations the main conduit 48 may inject the metered seed, with positive pressure, into a belted seed delivery mechanism 32 (such as the brush belt, flighted belt, etc. as described above). The positive pressure may be exhausted naturally through natural openings in the seed delivery mechanism 32, or an exhaust vent (not shown) may be provided in the seed delivery mechanism 32 or in the main conduit 48. In yet other implementations, the air pressure source may include other devices, such as a pressure vessel containing compressed air, a pump, an exhaust, etc.

Figure 9:
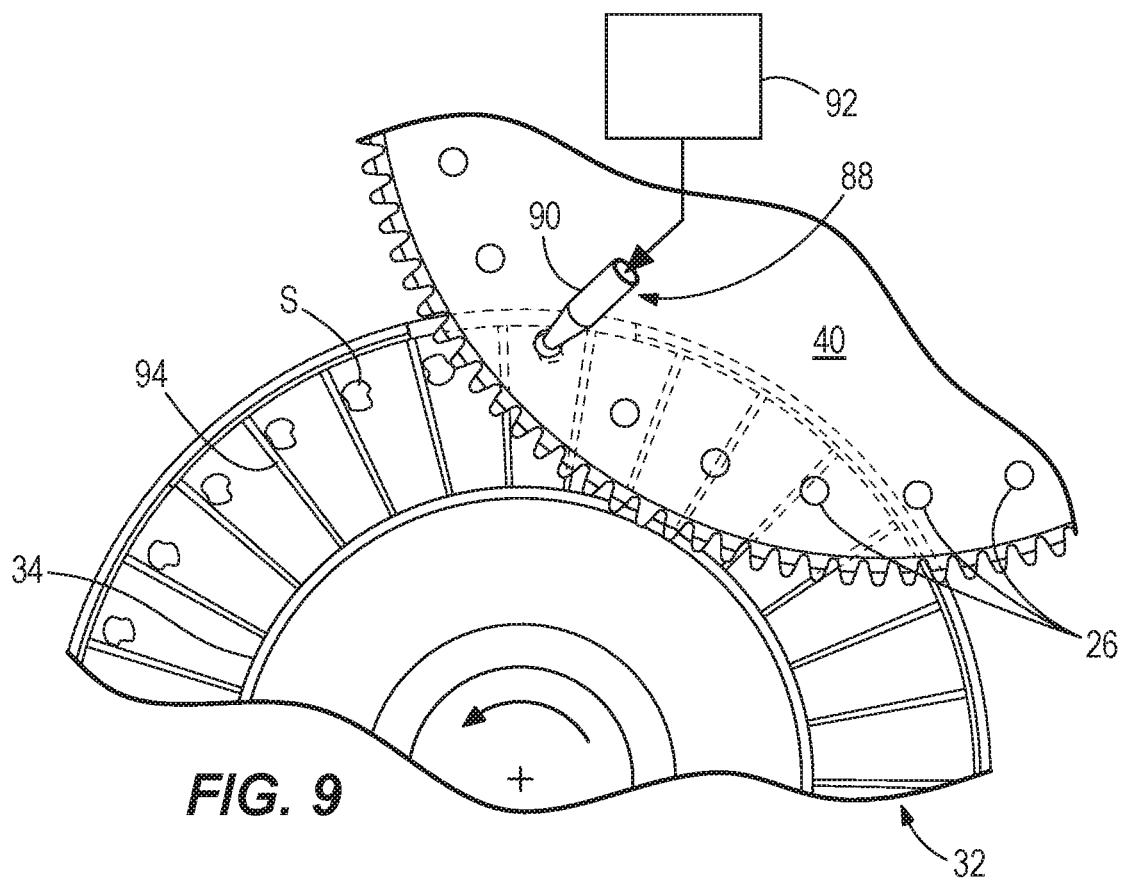
FIG. 9 is a side view of a portion of the seed meter assembly and a seed delivery mechanism having an alternative seed injection mechanism.
Figure 10:
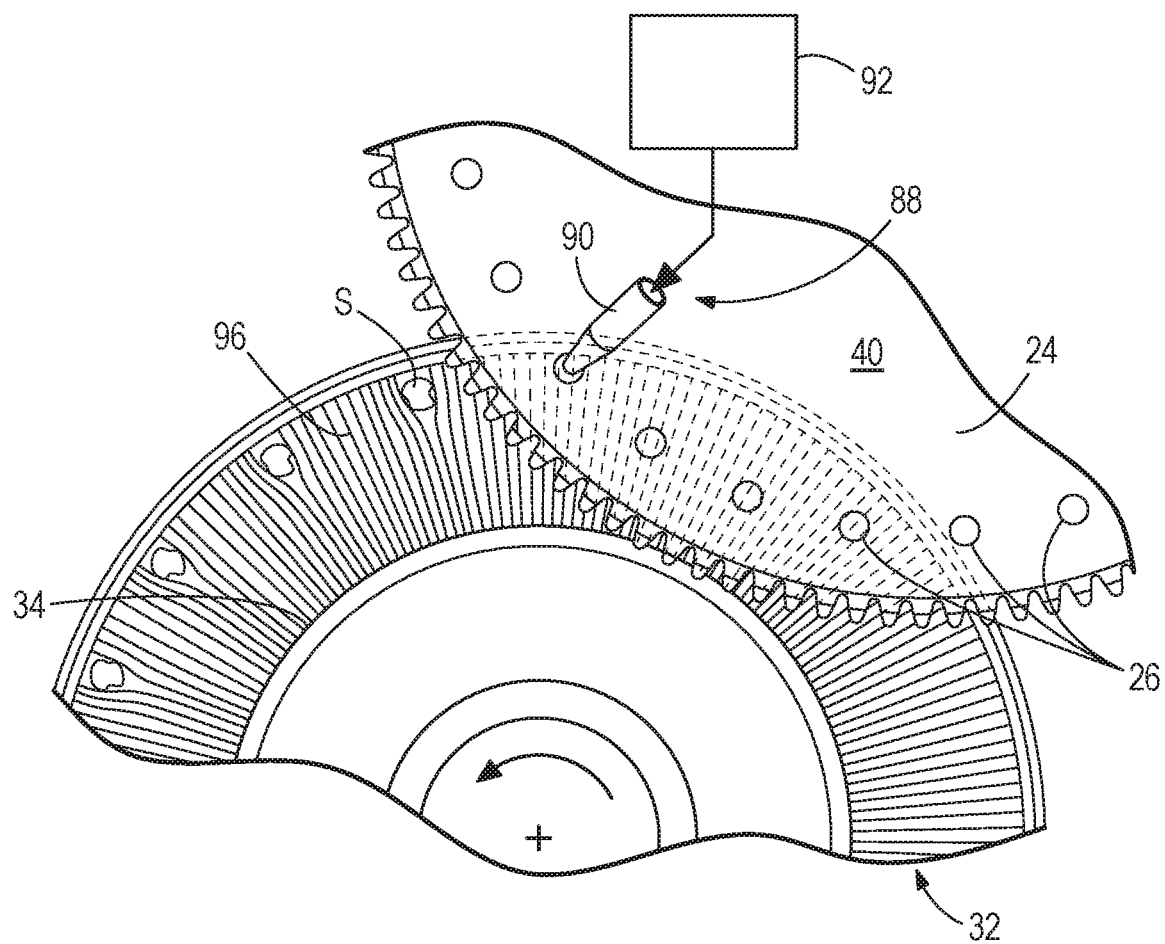

FIGS. 9 and 10 illustrate an alternative seed displacer 88 having a fixed nozzle 90 ejecting concentrated air from an air source 92 at or near the apertures 26 to urge the metered seeds S directly into the seed delivery mechanism 32. FIG. 9 illustrates the seed delivery mechanism 32 having a flighted belt 94, and FIG. 10 illustrates the seed delivery mechanism 32 having a brush belt 96. The nozzle 90 is disposed on the non-seed side 40 and disposed at the radial distance of the apertures 26 with respect to the meter axis A. The nozzle 90 is aimed towards the seed delivery mechanism 32 to directly inject the seeds S into the flighted belt 94 or into the bristles of the brush belt 96, or other type of seed delivery mechanism 32. The nozzle 90 may be disposed normal to the metering member 24 or at an angle between 0 and 90 degrees with respect to the metering member surface (e.g., the non-seed side 40). The seed delivery mechanism 32 may be disposed to receive the seed S from a top or a side of the seed delivery mechanism 32. The air source 92 may include a blower (such as the blower 64), or any other suitable air source such as a pressure vessel containing compressed air, a pump, an exhaust from another component, etc.

Figure 11:
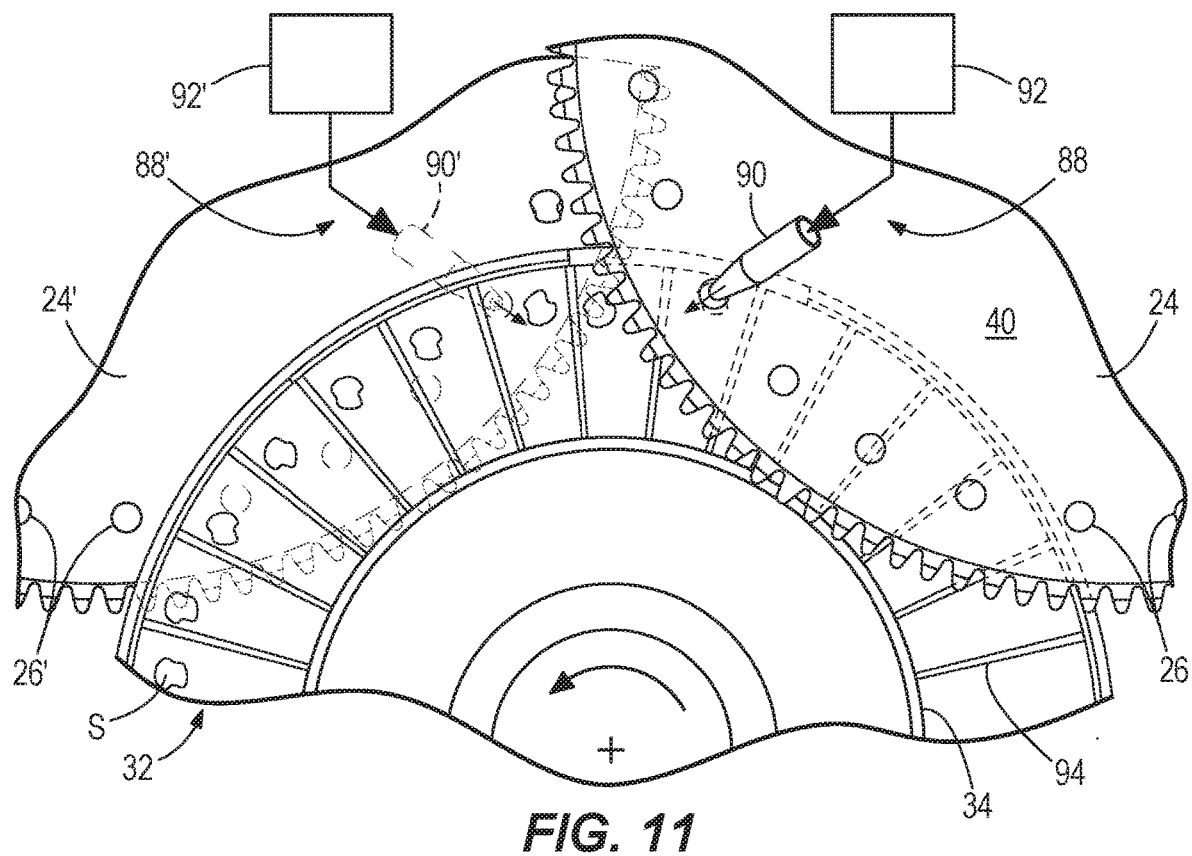
FIG. 11 is a side view of the seed injection mechanism of FIG. 9A with a dual seed meter assembly.
Figure 12:
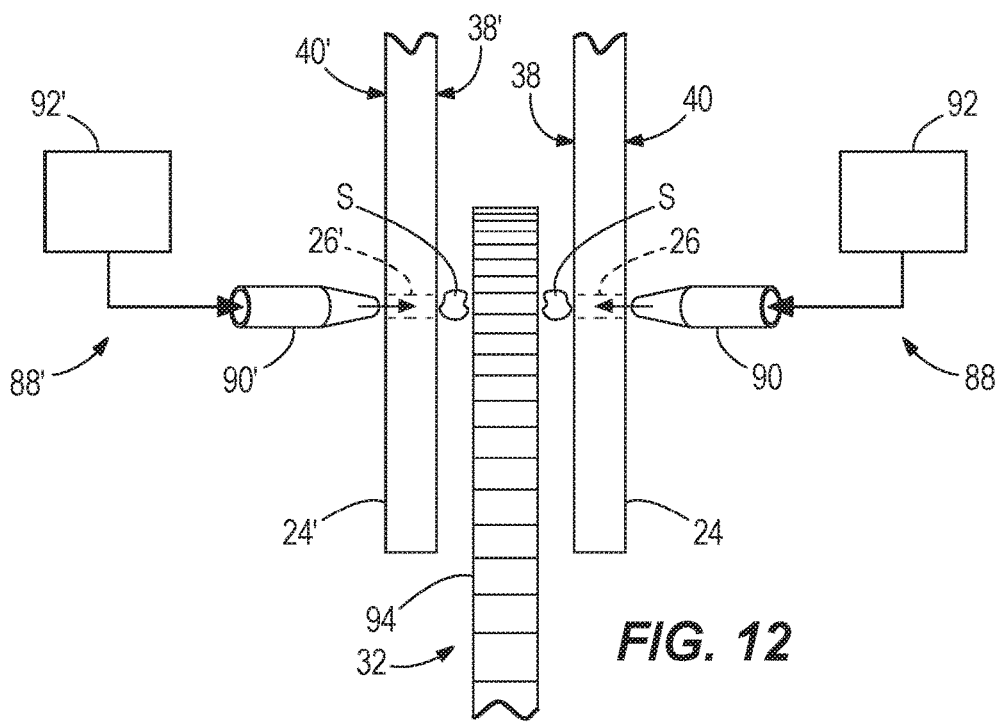
FIG. 12 is a front view of the seed injection mechanism of FIG. 11.

FIGS. 11-12 illustrate the seed displacer 88 employed with two metering members 24, 24' coupled to a single row unit frame 12, as was described above with respect to FIG. 7. The parts of the seed displacer 88 may be mirrored and are denoted herein with a "'" after the same reference numeral used above and need not be introduced again. The nozzles 90, 90' are collectively aimed inwardly towards the seed delivery mechanism 32. The nozzles 90, 90' may be disposed normal to the metering member 24, 24' or at an angle between 0 and 90 degrees with respect to the metering member 24, 24'. The seed S may be received from the top or the side of the seed delivery mechanism 32. While the flighted belt 94 is illustrated in FIGS. 11-12, it should be understood that the brush belt 96 (FIG. 10), or any other suitable type of seed delivery mechanism 32, may be employed with dual metering members 24, 24'.

Figure 9A:
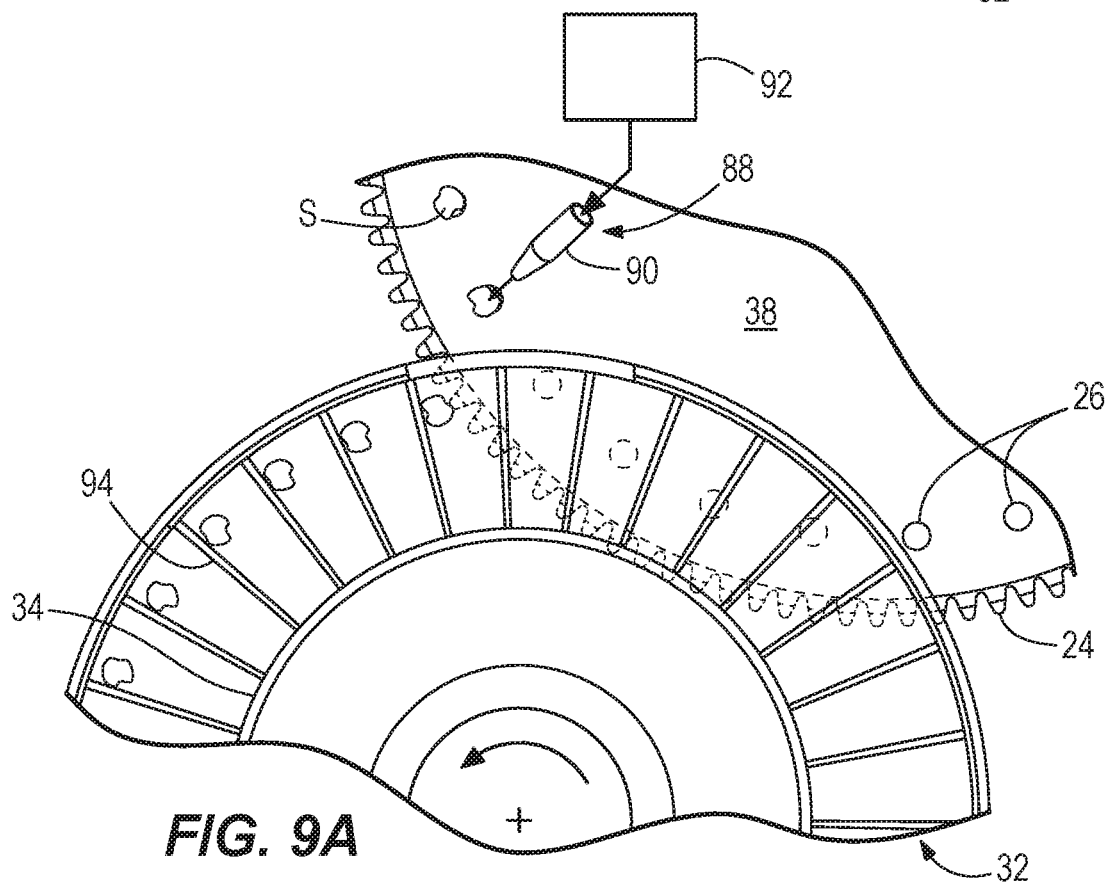

FIG. 9A illustrates an alternative to FIG. 9 having the fixed nozzle 90' disposed on the seed side 38 of the metering member 24. The nozzle 90' is disposed radially inwardly of the apertures 26 with respect to the meter axis A. The nozzle 90 is aimed towards the seed delivery mechanism 32 to directly inject the seeds S into the flighted belt 94 or into the bristles of the brush belt 96, or other type of seed delivery mechanism 32. The nozzle 90' may be disposed parallel to the metering member 24 or at an angle between 0 and 90 degrees with respect to the metering member surface (e.g., the seed side 38). The seed delivery mechanism 32 may be disposed to receive the seed S from a top or a side of the seed delivery mechanism 32.

In operation, the seed displacer 36 pneumatically encourages metered seeds away from the metering member 24 and towards, or into, the seed delivery mechanism 32. As the metering member 24 rotates, a vacuum applied in the vacuum zone 42 attracts seeds from the seed reservoir 28 onto the metering member 24. Ideally, one seed adheres to the metering member 24 at each aperture 26. The metering member 24 rotates, carrying the metered seeds towards the vacuum cutoff 44 where the vacuum force is terminated. In the vacuum cutoff 44, the seed displacer 36 pneumatically urges (e.g., by positive pressure and/or a pressure drop) the metered seeds towards, or into, the seed delivery mechanism 32 or the seed tube 68. For example, the seed displacer 36 may employ positive pressure nozzles 58, 78 on the non-seed side 40 of the metering member 24, through the apertures 26, to urge metered seeds away from the metering member 24. The seed displacer 36 may also employ a pressure drop on the seed side 38 of the metering member 24, which may be provided by the venturi 50, to urge metered seeds away from the metering member 24. The seed displacer 36 may also employ a focused positive pressure air stream on the seed side 38 to urge metered seeds to dislodge from the metering member 24. This focused positive pressure may be provided by the air knife 64, 64'. The seed displacer 36 may also employ the mechanical blade 56 independently, or in cooperation with any combination of the above pneumatic means, for dislodging the metered seeds and directing the metered seeds towards the seed delivery mechanism 32 or the seed tube 68. Alternatively, the seed displacer 88 may directly inject metered seeds into the seed delivery mechanism 32 or the seed tube 68. In implementations where a positive pressure adheres the seeds to the metering member 24, a negative pressure may be employed to remove the metered seeds from the metering member 24. In other words, a change from negative pressure to positive pressure, or from positive pressure to negative pressure, may be employed to remove metered seeds from the metering member 24.

Thus, the disclosure provides, among other things, a pneumatic seed displacer for moving seeds from one, two or more seed metering members to or toward a furrow in the soil.

What is claimed is:

1. A row unit for a seeding machine, the row unit comprising:
   a seed reservoir;
   a seed meter including a metering member configured to rotate about an axis, the metering member having a seed side facing the seed reservoir, a non-seed side opposite the seed side, and a plurality of apertures extending from the seed side to the non-seed side, wherein the axis is normal to a surface of the seed side, the seed meter operable by pressure differential between the non-seed side and the seed side to adhere seeds to the seed side and move seeds from the seed reservoir;
   a positive pressure air source; and
   an air outlet fluidly coupled to the positive pressure air source, the air outlet disposed on the seed side and aimed to discharge an air stream towards one aperture of the plurality of apertures, the dischargeable air stream having a directional component parallel to the axis.

2. The row unit of claim 1, wherein the air outlet includes a nozzle for concentrating the air stream.

3. The row unit of claim 1, wherein the air outlet includes an air knife having an opening for discharging the air stream, the opening being elongated in a direction transverse to the dischargeable air stream.

4. The row unit of claim 1, wherein the positive pressure air source includes a blower, and wherein the blower also is configured to generate the pressure differential.

5. The row unit of claim 1, wherein the seed meter is a vacuum seed meter including a blower having an intake side and an outlet side, the intake side configured to generate a lower than atmospheric pressure on a portion of the non-seed side, wherein the positive pressure air source is the outlet side of the blower.

6. The row unit of claim 1, wherein the seed meter includes a housing partially defining a chamber for containing the pressure differential, wherein the seed meter further includes a region disposed immediately adjacent the chamber in a circumferential direction with respect to the axis, the region not under the influence of the pressure differential, wherein the air outlet is aimed towards the region immediately adjacent the chamber in the circumferential direction.

7. The row unit of claim 1, further comprising a vacuum source configured to generate the pressure differential.

8. The row unit of claim 1, further comprising a seed tube configured to direct the seeds from the metering member to a seed outlet, wherein the air outlet is configured to dislodge the seeds from the metering member into the seed tube.

9. The row unit of claim 8, further comprising an air brake disposed proximate the seed outlet for reducing an air speed at the seed outlet.

10. The row unit of claim 1, wherein the metering member is a first metering member, the axis is a first axis, the surface is a first surface, and the seed side is the first seed side, wherein the seed meter further includes a second metering member rotatable about a second axis and having a second seed side, the second axis being generally normal to a second surface of the second seed side, wherein the air outlet is a first air outlet, the row unit further comprising a second air outlet fluidly coupled to the positive pressure air source, the second air outlet disposed on the second seed side and aimed to discharge another air stream towards the second surface, the dischargeable other air stream having a directional component parallel to the second axis.

11. The row unit of claim 1, wherein the seed meter includes a housing defining a chamber for containing the pressure differential, wherein the seed meter further includes a region disposed immediately adjacent the chamber in a circumferential direction with respect to the axis, the region not under the influence of the pressure differential, wherein the air outlet includes a nozzle aimed towards the region immediately adjacent the chamber.

12. A method for displacing seeds from a metering member in a seeding machine, the seeding machine having a seed reservoir, a seed meter assembly including the metering member having a seed side facing the seed reservoir, a non-seed side opposite the seed side, and a plurality of apertures extending from the seed side to the non-seed side, the metering member operable to selectively transport seeds from the seed reservoir, the method comprising:

rotating the metering member about an axis normal to a surface of the seed side;

generating a pressure differential across at least some apertures of the plurality of apertures for adhering seeds to the metering member; and directing an air stream at the seed side and towards one aperture of the plurality of apertures, the air stream having a directional component parallel to the axis.

13. The method of claim 12, wherein the directing includes using a nozzle to concentrate the air stream.

14. The method of claim 12, wherein the directing includes using an air knife with an opening elongated in a direction transverse to the air stream to direct the air stream.

15. The method of claim 12, further comprising using a pump to generate the pressure differential and to provide the air stream.

16. The method of claim 12, wherein generating the pressure differential includes generating a vacuum on the non-seed side.

17. The method of claim 16, further comprising using a blower having an inlet side and an outlet side, generating the vacuum at the inlet side, and generating the air stream at the outlet side.

18. The method of claim 12, further comprising using a blower to generate the air stream and generating the pressure differential using the blower.

19. The method of claim 12, further comprising providing a housing defining a chamber for containing the pressure differential, directing the air stream with a nozzle aimed towards a region disposed immediately adjacent the chamber in a circumferential direction with respect to the axis, the region not under the influence of the pressure differential.

* * * * *